A. WARREN.

STOCKING AND SKIRT HOLDER.

No. 7,347. Reissued Oct. 10, 1876.

WITNESSES
Frank G. Parker
E. A. Stock

INVENTOR
A. Warren
by J. H. Adams
Atty.

THE NORRIS PETERS CO., PHOTO-LITHO., WASHINGTON, D. C.

UNITED STATES PATENT OFFICE.

ANDREW WARREN, OF WALTHAM, MASSACHUSETTS.

IMPROVEMENT IN STOCKING AND SKIRT HOLDERS.

Specification forming part of Letters Patent No. 159,291, dated February 2, 1875; reissue No. 7,347, dated October 10, 1876; application filed July 14, 1876.

*To all whom it may concern:*

Be it known that I, ANDREW WARREN, of Waltham, in the county of Middlesex and State of Massachusetts, have invented a new and Improved Stocking and Skirt Holder, of which the following is a specification:

The object of my invention is to produce a stocking and skirt holder of a most simple form, and at very small cost, which can be attached and detached quickly and with great convenience without requiring shifting of other parts to secure and release the hold, as in the clamp with sliding band over it, or working a tongue and catch, as in other skirt-holders in use; and my invention consists in forming a holder with an opening large at the top and gradually contracting into a narrow slot with parallel or nearly parallel sides.

Figure 1:
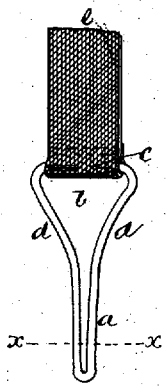
Figure 2:
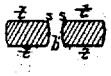
Figure 3:
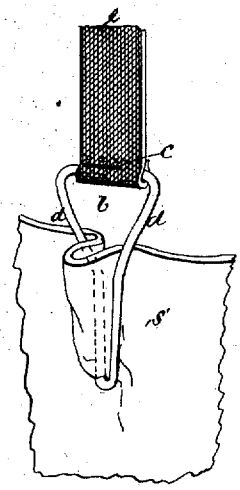

In the drawing, Figure 1 is a view of the holder, showing one form; Fig. 2, a view showing it applied to a stocking; Fig. 4, an enlarged section on the line *x x*, Fig. 1.

The holder shown in the drawings is made by doubling a suitable wire in the middle of its length in such a manner as to form a slot, *b'*, for a certain length, then bending the two sides of the clasp outward, so as to gradually widen the space *b* so formed to the width of the strap, then returning and uniting the two ends of the wire in a right-angular direction to the longest dimensions of the clasp, forming a cross-bar, *c*, for the attachment of the strap or band C of the supporter.

In applying this holder, a small portion of the stocking or skirt, either at the edge or any other convenient place, may be drawn into the enlarged opening or loop *b* of the holder, and then pushed downward into the narrow space *b'*, where it is compressed and firmly held; or, in disengaging, the garment is pulled from the slot *b'* into the larger portion of the opening, thus freeing it from the holder.

The whole operation of attaching and detaching the holder to and from the garment is extremely simple, and the parts are not liable to get out of order or tear the garment.

It will be apparent that this is of the utmost importance, that the sides of the holder forming the slot should not be rounded, as the rounded edges would permit the stocking to slip too readily through the opening *b'*. I therefore make the holder, when of wire, flat on both faces *t t*, thereby forming corners or edges *s s* sufficiently sharp to prevent the slipping that would ensue if the holder were rounded at these points.

The holder may be manufactured in other ways, as above indicated, as it may be stamped out of a plate of steel or other suitable material which is rigid and unyielding under the lateral pressure exerted by the drawing downward of the stocking.

I do not confine myself to the exact form as shown, as this may be more or less modified; but

I claim—

1. The metallic stocking-holder composed of the enlarged portion at the top, and converging sides flat on their faces, and provided with holding-edges, substantially as and for the purpose set forth.

2. The holder adapted for attachment to the band or strap of a stocking-supporter, having an opening enlarged at the top and contracted at the bottom, to form a slot having converging sides with flat faces *t t* and holding-edges *s s*, as set forth.

3. The combination, with the strap or band *c* of a stocking-supporter, of a holder having an opening enlarged at the top and merging downward into a narrow slot, provided with flat faces and holding-edges, and constituting the sole means for retaining the stocking, as set forth.

ANDREW WARREN.

Witnesses:
J. H. ADAMS,
FRANK G. PARKER.